United States Patent
Hyde, II et al.

(10) Patent No.: US 7,707,460 B2
(45) Date of Patent: Apr. 27, 2010

(54) METHOD, APPARATUS AND PROGRAM STORAGE DEVICE FOR PROTECTING DATA WRITES IN A DATA STORAGE DEVICE

(75) Inventors: Joseph Smith Hyde, II, Tucson, AZ (US); Ronald J. Venturi, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 11/406,540

(22) Filed: Apr. 19, 2006

(65) Prior Publication Data

US 2006/0242459 A1    Oct. 26, 2006

(30) Foreign Application Priority Data

Apr. 20, 2005    (GB)    ................ 0507912.4

(51) Int. Cl.
G06F 11/00    (2006.01)
(52) U.S. Cl. ............................ 714/42; 714/30; 711/142
(58) Field of Classification Search ..................... 714/5, 714/30, 42; 711/142
See application file for complete search history.

(56) References Cited

U.S. PATENT DOCUMENTS

| | | | |
|---|---|---|---|
| 5,353,430 A | 10/1994 | Lautzenheiser | |
| 5,379,417 A | 1/1995 | Lui et al. | |
| 5,557,770 A | 9/1996 | Bhide et al. | |
| 5,615,335 A * | 3/1997 | Onffroy et al. | ................ 714/30 |
| 5,632,012 A | 5/1997 | Belsan et al. | |
| 5,845,326 A | 12/1998 | Hirayama et al. | |
| 5,941,998 A * | 8/1999 | Tillson | ........................ 714/54 |
| 6,412,045 B1 | 6/2002 | DeKoning et al. | |
| 6,578,164 B1 * | 6/2003 | Stokes et al. | ................ 714/719 |
| 6,584,589 B1 | 6/2003 | Perner et al. | |
| 6,658,533 B1 | 12/2003 | Bogin et al. | |
| 6,928,518 B2 | 8/2005 | Talagala | |
| 7,020,805 B2 * | 3/2006 | Talagala et al. | ................ 714/42 |
| 7,360,112 B2 * | 4/2008 | Durica et al. | .................. 714/5 |
| 2003/0145270 A1 * | 7/2003 | Holt | ........................... 714/766 |
| 2005/0251628 A1 * | 11/2005 | Jarvis et al. | ................. 711/136 |
| 2006/0098320 A1 * | 5/2006 | Koga et al. | .................... 360/53 |
| 2006/0109792 A1 * | 5/2006 | Broadbent et al. | .......... 370/248 |
| 2006/0112306 A1 | 5/2006 | Chessin et al. | |
| 2007/0011414 A1 | 1/2007 | Nakayama et al. | |

FOREIGN PATENT DOCUMENTS

EP    0750259    5/2002
WO    WO 9212482    7/1992

* cited by examiner

*Primary Examiner*—Philip Guyton
(74) *Attorney, Agent, or Firm*—William K. Konrad; Konrad Raynes and Victor LLP

(57) ABSTRACT

A method, apparatus and program storage device for protecting data write operations against write failures in a data storage device is provided. The data storage device includes a storage medium, a write cache including a copy of data written to the storage medium, and a controller configured for testing data write operations to the storage medium. The controller tests data write operations to the storage medium before the write cache is flushed to confirm that it is safe to flush the write cache. If the test fails, the data in the write cache can be recovered.

21 Claims, 3 Drawing Sheets

METHOD, APPARATUS AND PROGRAM STORAGE DEVICE FOR PROTECTING DATA WRITES IN A DATA STORAGE DEVICE

BACKGROUND OF THE INVENTION

1. Field of the Invention

This invention relates in general to data storage devices, and more particularly to a method, apparatus and program storage device for protecting data write operations against write failures in a data storage device.

2. Description of Related Art

Disk drives are a form of data storage wherein data is read from and written onto storage media. There are different types of disk drives for different types of storage media. Different types of storage media include magnetic hard disks, floppy disks and optical disks. Although the term disk drive is used throughout this document, the storage media may not be in the form of a disk, but instead may be implemented in another form, for example, tape storage. Disk drives can be either internal and housed within a computer or external and housed separately from a computer.

Disk drives may be used in storage systems in which a plurality of separate disk drives is combined into a single storage system. Such storage systems include RAID (redundant array of independent disks) architectures, which use several low-cost disk drives to create a large and reliable storage system.

Disk drives may use caching to improve their performance. A cache is a small fast memory holding recently accessed or written data. When data is read from or written to a storage medium, a copy is also saved in the cache, along with the associated medium storage address. A disk cache can be implemented in software in a computer or in hardware in a disk drive.

A read cache is used to save a copy of data that is read from a storage medium. The read cache monitors addresses of subsequent reads to see if the required data is already in the read cache. If it is, then it is returned immediately and the read of the storage medium can be aborted. If it is not already in the cache, the data is read from the storage medium and saved in the read cache.

A write cache can be a write-through cache in which data is written to the storage medium at the same time as it is cached. In a write-through cache, an entry that is to be replaced can be overwritten in the cache. Alternatively, a write cache can be a write-back cache in which data is only written to the storage medium when it is forced out of the cache.

Data that is written to disk drives is assumed to have been saved if the drive indicates a good completion to the write operation, with no errors reported. However, there remains a small possibility for error, in which the drive itself is unable to detect whether the data has been correctly recorded without re-reading the data and comparing it to the written data. Situations in which such an error occurs are known as dropped write failures. Any data which is not otherwise backed up or protected will be permanently lost in a dropped write failure and so a defense against this possibility is needed.

Most conventional methods imply a much longer write operation using a readback check to verify that the written data is safe. These are not efficient methods since they execute on all writes, but will very rarely detect a failure. This means that all of the good writes carry an unnecessary performance penalty.

It can be seen that there is a need for a method, apparatus and program storage device for protecting data write operations against write failures in a data storage device.

SUMMARY OF THE INVENTION

To overcome the limitations in the prior art described above, and to overcome other limitations that will become apparent upon reading and understanding the present specification, the present invention discloses a method, apparatus and program storage device for protecting data write operations against write failures in a data storage device.

The present invention solves the above-described problems by combining a read/write self-test with a write-through data cache to provide protection against data loss caused by a permanent write failure. A self-test is used to confirm that it is safe to flush the write-through data cache. If the self-test fails, all of the data in the write-through cache is at risk of not having been written through to the storage medium. However, system error recovery can be invoked while this data is still available in the storage device.

A disk drive in accordance with the principles of the present invention includes a storage medium, a write cache including a copy of data written to the storage medium and a controller configured for testing data write operations to the storage medium, wherein the controller tests data write operations to the storage medium before flushing the write cache.

In another embodiment of the present invention, a method is provided for protecting data write operations in a disk drive. The method includes saving write data to a write cache and to a storage medium, testing data write operations to the storage medium and flushing the write cache after a test of data write operations completes successfully.

In another embodiment of the present invention, a computer program product comprising a set of program instructions for controlling a computer or similar device is provided. When executed the program instructions cause operations to be performed, including saving write data to a write cache and to a storage medium, testing data write operations to the storage medium and flushing the write cache after a test of data write operations completes successfully.

In another embodiment of the present invention, a controller is provided for processing data read and write operations to a storage medium via read and write caches. The controller includes a read/write self-test procedure for testing data write operations to the storage medium, wherein the self-test procedure tests data write operations to the storage medium before flushing the write cache.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for protecting data write operations against write failures in a data storage device. A read/write self-test is performed to determine whether the storage device failed at some point since the previous test thereby indicating that some writes may have been dropped since the previous test. A write-through data cache is used to receive data to be written to the storage device. This cache is of limited size, and so the period of time for which it can retain a copy of the data written to the drive will vary. The cache is flushed or overwritten when sufficient quantities of new data arrive. According to an embodiment of the present invention, these two mechanisms are combined to provide protection against data loss caused by a permanent write failure. The self-test confirms that it is safe to flush the write-through data cache. If the test fails, all of the data in the write-through cache is at risk of not having been written through to the storage medium. However, system error recovery may be invoked while this data is still available in the disk drive.

Figure 1:
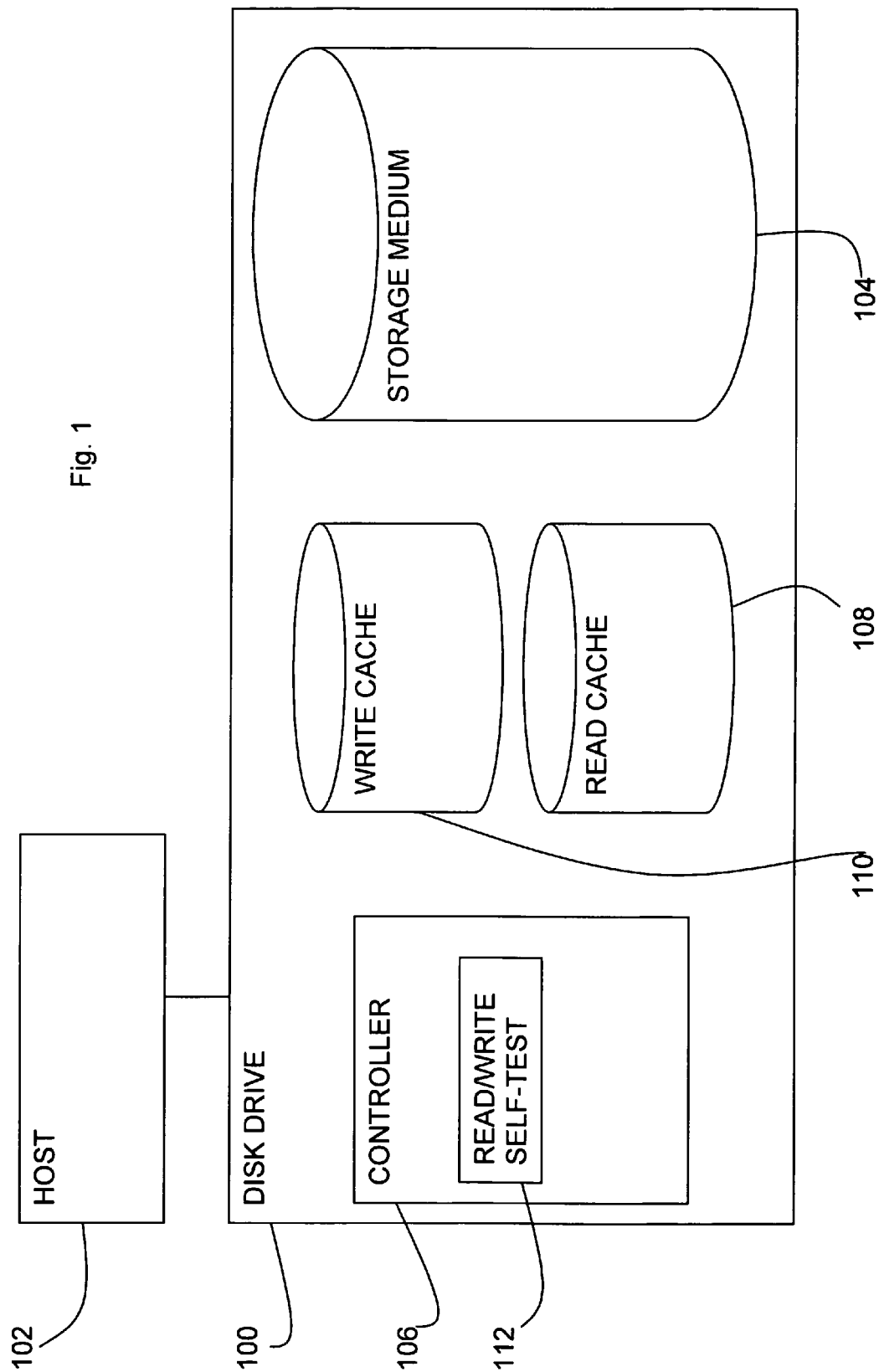
FIG. 1 is a block diagram of a disk drive in which the present invention may be implemented.

FIG. 1 illustrates a storage device 100 according to an embodiment of the present invention. In FIG. 1, the storage device is a disk drive 100. The disk drive 100 is accessed by a host computer system 102 for reading and writing data to a storage medium 104. The storage medium 104 may be one or more disks, for example, magnetic hard disks, floppy disks or optical disks, or may be another form of storage medium. The disk drive 100 may be internal to a host computer system 102 or external as a peripheral storage device. The disk drive 100 may also form part of a larger storage system comprising a plurality of disk drives.

The disk drive 100 includes a read cache 108 and a write cache 110 which provide improved performance for reads and writes of the storage medium 104. The disk drive also has a controller 106 for processing data read and writes via the read and write caches 108, 110. The controller 106 includes a read/write self-test procedure 112.

The write cache 110 is in the form of a write-through data cache in which data is written to the storage medium 104 at the same time as it is cached in the write cache 110. The disk drive 100 does not signal completion of a write operation until it has written the data that is buffered in the write cache 110 through to the storage medium 104. The I/O requests are completed only once the code has attempted to write the data to the storage medium 104. In this way, the write cache 110 is storing data that should already be on the storage medium 104. The write cache 110 is of limited size, and so the period of time for which it can retain a copy of the data written to the disk drive 100 will vary.

The read/write self-test procedure 112 operates to detect any failures in the read and writes to the storage medium 104. A test failure means that the disk drive 100 failed at some point since the previous test, and so some writes may have been dropped since then. Self-test procedures 112 can be scheduled by a host system 102, e.g., by a SCSI Send Diagnostic command.

Figure 2:
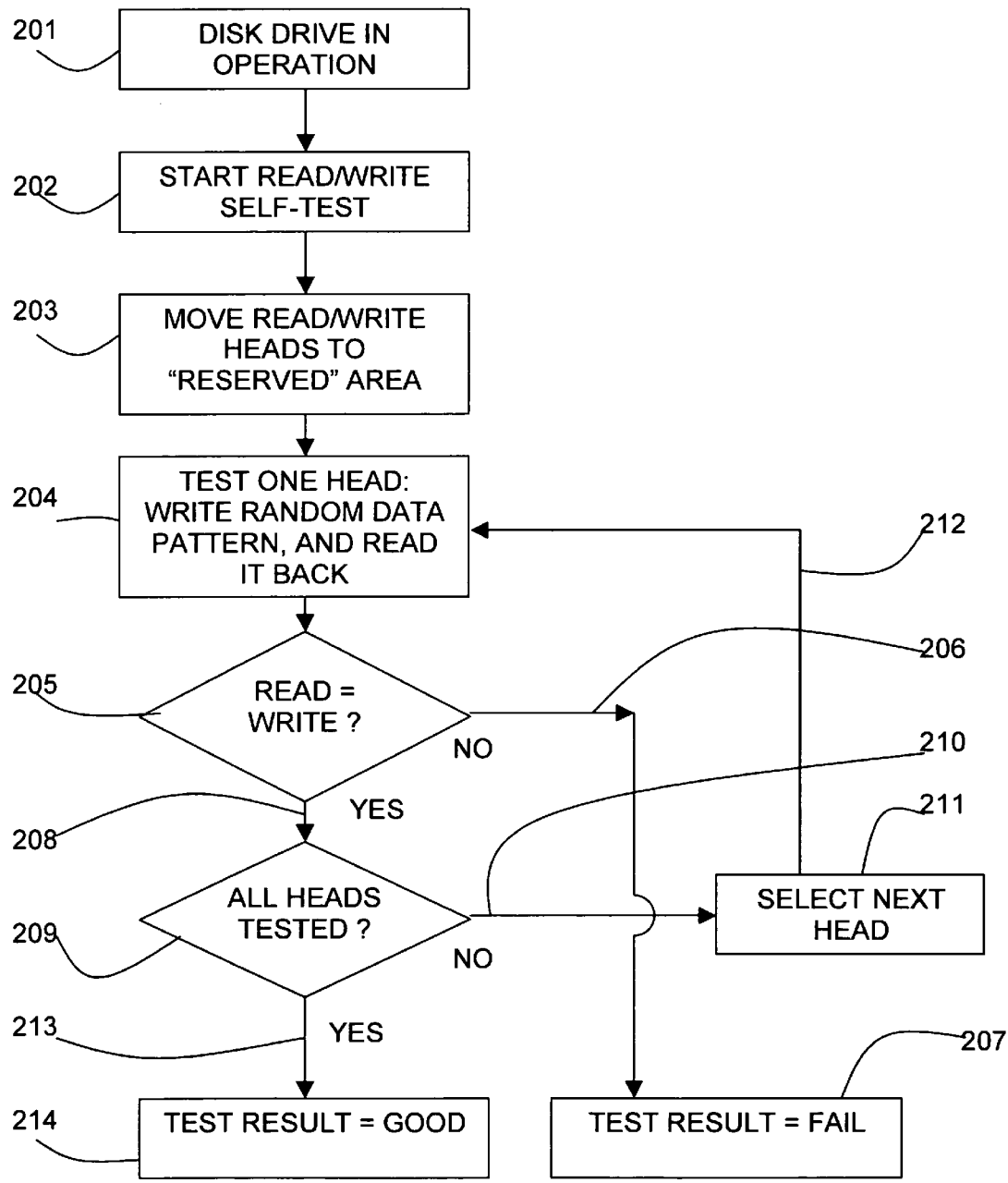
FIG. 2 is a flow diagram of a method of a read/write self-test in accordance with the present invention.

FIG. 2 shows a flow diagram of a read/write self-test procedure 112 according to an embodiment of the present invention. A disk drive is in operation 201 and a self-test is started 202. The read/write heads of the disk drive 100 are moved to a reserved area 203. One head is tested 204 by writing a random data pattern and reading it back. A determination 205 is made whether the read is the same as the random write. If it is not the same 206, the result of the self-test is a fail 207. If it is the same 208, it is then determined 209 if all heads have been tested. If all the heads have not been tested 210, the next head is selected 211 and the flow loops 212 and tests 204 the next head. If all the heads have been tested 213, the self-test result is good 214.

Referring to both FIGS. 1 and 2, a write cache 110 is combined with a read/write self-test procedure 112 by using the self-test procedure 112 to confirm that it is safe to flush the write cache 110. If the self-test procedure 112 fails, then all of the data in the write cache 110 is at risk of not having been written through to the storage medium 104. System error recovery procedures can be invoked while this data is still available in the write cache 110 of the disk drive 100.

A large write cache 110, possibly at the expense of a read cache 108, can be allocated to retain all non-verified data that has been written to the disk drive 100. The write cache 110 will survive any resets applied to the disk drive 100 except for a power-on-reset (POR). All data will remain in the write cache 110 until one of the following events occurs.

1. The cache is almost full. An immediate self-test procedure 112 is performed and if the test result is clear, the write cache 110 can be flushed.
2. A further write of some already cached data is received. The cached data in the write cache 110 is replaced.
3. A scheduled self-test procedure 112 completes with a clear result. The write cache 110 can be flushed.

In another embodiment of the present invention, the time taken for this self-test procedure 112 may be minimized by running the self-test only for those heads that have been written for the data currently held in the write cache 110. The write-through cache 110 will "know" which heads were used when the data in the cache 110 was written through to the storage medium 104. If only a subset of the total heads available were used for all of the data currently in the cache 110, then it is only necessary to read/write test that subset of heads to ensure that the cached data was written through to the storage medium 104. In another embodiment, only a head that has been used for writing data since the last test was performed, is tested.

In another embodiment of the present invention, the frequency of these scheduled tests may be reduced in light of the event-driven test at point 1 above. The self-test procedure 112 takes a considerable amount of time to complete. So in some workloads, it may be better to disable the "regular" (i.e., clock-driven) self-tests, and rely only on the "cache almost full" (i.e., event-driven) self-tests. This avoids the situation where a clock-driven test gets scheduled immediately after an event-driven test, in which case the second test is superfluous.

A failure of the self-test procedure 112 at points 1 or 3 above will cause the controller 106 of the disk drive 100 to set a write protect mode and to return an error condition to the next command. This will alert the host system 102 to the failure. It also ensures that all data written to the disk drive 100 is held within the write cache 110 until it can be confirmed that there is no hard failure of the write mechanism, i.e. the heads of the disk drive are writing correctly. On receipt of the error condition mentioned above, an error recovery procedure can be carried out, which can include recovery of all data written to the disk drive 100.

Any subsequent reads issued to the disk drive 100 while in a "self-test failed mode" would cause the disk drive 100 to look for the requested data in the write cache 110 and return it from there. If the data is not found in the write cache 110, then the data is read as normal from the storage medium 104. This behavior of the disk drive 100 allows the system to recover all data written to the disk drive 100, as part of an error recovery and drive replacement action.

Figure 3:
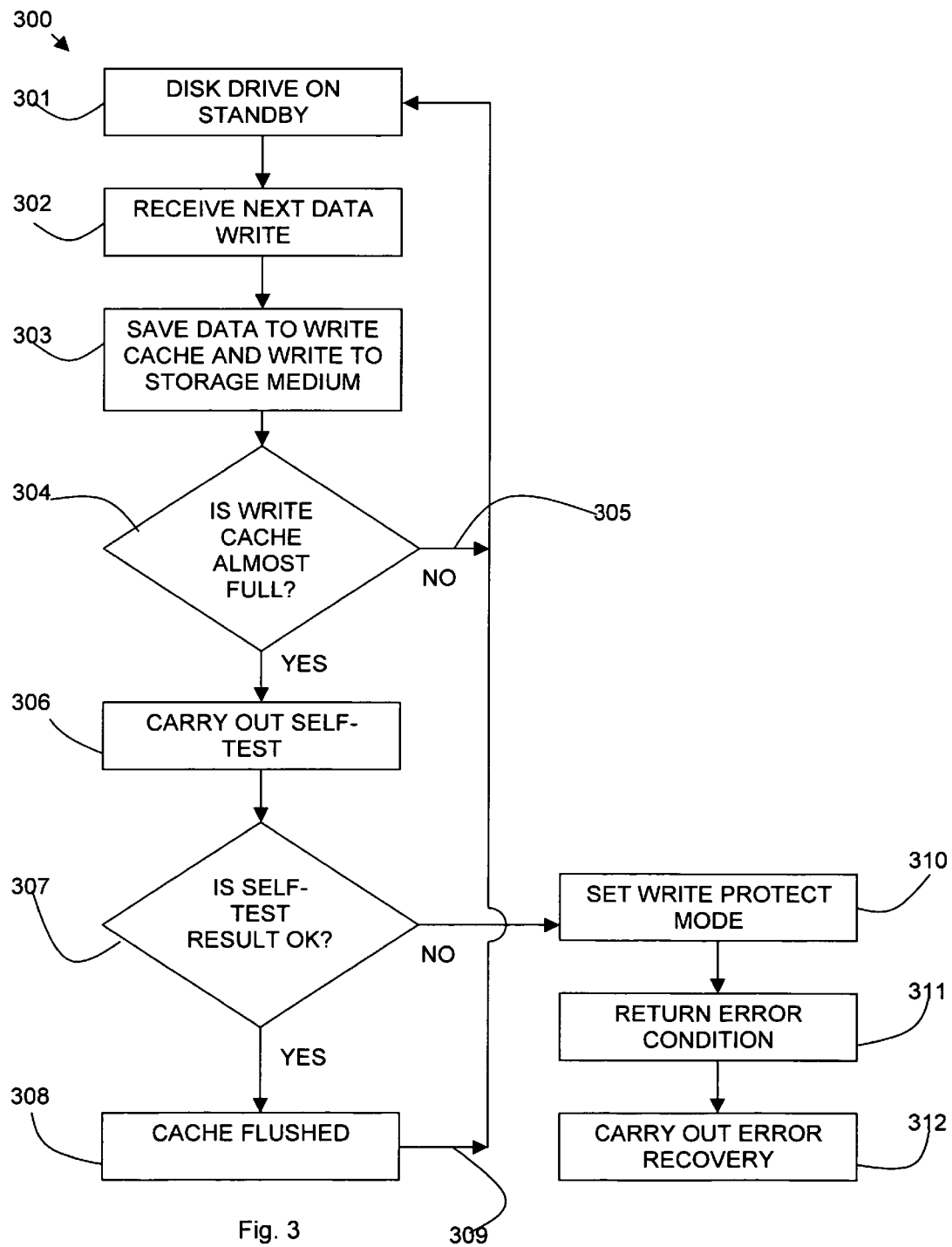
FIG. 3 is a flow diagram of a method in accordance with the present invention.

FIG. 3 shows a flow diagram 300 of a method of combining a self-test procedure and a write cache in a disk drive according to an embodiment of the present invention. A disk drive is provided on standby 301 to receive 302 a next data write request. The data of the write request is saved to the write cache and written to the storage medium 303. A determination 304 is made whether the write cache is almost full. If it is not almost full 305, the disk drive returns to the state of standby 301 for a next write request.

If the write cache is almost full, a self-test procedure 306 is carried out. A determination 307 is made whether the self-test result is good. If the self-test result is good, the write cache is flushed 308 and the disk drive returns 309 to the state of standby 301. If the result of the self-test procedure is not good, a write protect mode is set 310, an error condition is returned 311 and an error recovery procedure 312 is carried out before the disk drive can return to normal operation. Those skilled in the art will recognize that embodiments of the present invention are equally applicable in any storage system architecture with any disk drive interface, since it is applied at the disk drive level.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive comprising:
   a storage medium;
   a write cache including a copy of data written to the storage medium; and
   a controller configured for testing data write operations to the storage medium, wherein the controller tests data write operations to the storage medium before flushing the write cache, and wherein the controller is further configured to:
   check if the write cache is substantially full, and if so, carry out said testing of data write operations to the storage medium.

2. The disk drive of claim 1, wherein the controller is further configured to:
   at regular clock intervals at a first workload of data write operations, carry out said testing of data write operations to the storage medium;
   in response to a change in workload of data write operations, reduce the frequency of said testing of data write operations at regular clock intervals; and
   protect the write cache if a test of data write operations fails, and perform an error recovery procedure by recovering the write data from the write cache;
   wherein testing data write operations comprises testing at least one head of the disk drive using a random write and read back and testing only a head that has been used for writing data since the last test was performed.

3. The disk drive of claim 2, wherein the controller is further configured to in response to a change in workload of data write operations, disable said testing of data write operations at regular clock intervals so that carrying out testing of data write operations to the storage medium is performed only when the write cache is determined to be substantially full.

4. The disk drive of claim 1, wherein the testing is a self-test procedure of the disk drive.

5. The disk drive of claim 1, wherein the testing carries out a test of data write operations since the last test was carried out.

6. The disk drive of claim 1, wherein the write cache is a write-through data cache.

7. The disk drive of claim 1, wherein testing includes testing at least one head of the disk drive by a random write and read back.

8. The disk drive of claim 7, wherein the testing tests only a head that has been used for writing data currently held in the write cache.

9. A method for protecting data write operations in a disk drive, comprising:
   saving write data to a write cache and to a storage medium;
   testing data write operations to the storage medium;
   flushing the write cache after a test of data write operations completes successfully; and
   checking if the write cache is substantially flail, and if so, carrying out said testing of data write operations to the storage medium.

10. The method of claim 9 further comprising:
    at regular clock intervals at a first workload of data write operations, carrying out said testing of data write operations to the storage medium;
    in response to a change in workload of data write operations, reducing the frequency of said testing of data write operations at regular clock intervals; and
    protecting the write cache if a test of data write operations fails, and performing an error recovery procedure by recovering the write data from the write cache.

11. The method of claim 10 further comprising in response to a change in workload of data write operations, disabling said testing of data write operations at regular clock intervals so that carrying out testing of data write operations to the storage medium is performed only when the write cache is determined to be substantially full.

12. The method of claim 9 further comprising performing an error recovery procedure by recovering the write data from the write cache.

13. The method of claim 9, wherein the testing data write operations further comprises testing at least one head of the disk drive using a random write and read back.

14. The method of claim 9, wherein the testing further comprises testing only a head that has been used for writing data currently held in the write cache.

15. The method of claim 9, wherein the testing further comprises testing only a head that has been used for writing data since the last test was performed.

16. A program storage device, comprising:
program instructions executable by a processing device to perform operations for protecting data write operations against write failures in a storage device, the operations comprising
saving write data to a write cache and to a storage medium;
testing data write operations to the storage medium; and
flushing the write cache after a test of data write operations completes successfully;
at regular clock intervals at a first workload of data write operations, carrying out said testing of data write operations to the storage medium;
checking if the write cache is substantially full, and if so, carrying out said testing of data write operations to the storage medium; and
in response to a change in workload of data write operations, reducing the frequency of said testing of data write operations at regular clock intervals.

17. A device for processing data read and writes to a storage medium of a disk drive having at least one head via read and write caches, comprising a controller configured to perform a read/write self-test procedure for testing data write operations to the storage medium, wherein the self-test procedure tests data write operations to the storage medium before flushing the write cache, wherein the controller is further configured to:
check if the write cache is substantially full, and if so, carry out said testing of data write operations to the storage medium.

18. The device of claim 17, wherein the controller is further configured to:
at regular clock intervals at a first workload of data write operations, carry out said testing of data write operations to the storage medium;
in response to a change in workload of data write operations, reduce the frequency of said testing of data write operations at regular clock intervals; and
protect the write cache if a test of data write operations fails, and performing an error recovery procedure by recovering the write data from the write cache;
wherein testing data write operations comprises testing at least one head of the disk drive using a random write and read back and testing only a head that has been used for writing data since the last test was performed.

19. The device of claim 18, wherein the controller is further configured to in response to a change in workload of data write operations, disable said testing of data write operations at regular clock intervals so that carrying out testing of data write operations to the storage medium is performed only when the write cache is determined to be substantially full.

20. The device of claim 17, wherein the self-test procedure tests at least one head of the disk drive by a random write and read back.

21. A method for protecting data write operations in a disk drive, comprising:
saving write data to a write cache and to a storage medium;
testing data write operations to the storage medium;
at regular clock intervals, carrying out said testing of data write operations to the storage medium;
checking if the write cache is substantially full, and if so, carrying out said testing of data write operations to the storage medium;
in response to a change in workload of data write operations, disabling said testing of data write operations at regular clock intervals so that carrying out testing of data write operations to the storage medium is performed only when the write cache is determined to be substantially full;
flushing the write cache after a test of data write operations completes successfully; and
protecting the write cache if a test of data write operations fails, and performing an error recovery procedure by recovering the write data from the write cache;
wherein testing data write operations comprises testing at least one head of the disk drive using a random write and read back and testing only a head that has been used for writing data since the last test was performed.

* * * * *